United States Patent
Tur et al.

(10) Patent No.: US 9,885,619 B2
(45) Date of Patent: Feb. 6, 2018

(54) PUMP-POWER-INDEPENDENT DOUBLE SLOPE-ASSISTED DISTRIBUTED AND FAST BRILLOUIN FIBER-OPTIC SENSOR

(71) Applicant: Ramot at Tel-Aviv University Ltd., Tel Aviv (IL)

(72) Inventors: Moshe Tur, Tel Aviv (IL); Avi Motil, Azor (IL); Yair Peled, Kfar Ruth (IL); Or Danon, Tel-Aviv (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 64 days.

(21) Appl. No.: 15/109,644

(22) PCT Filed: Jan. 1, 2015

(86) PCT No.: PCT/IL2015/050006
§ 371 (c)(1),
(2) Date: Jul. 4, 2016

(87) PCT Pub. No.: WO2015/101995
PCT Pub. Date: Jul. 9, 2015

(65) Prior Publication Data
US 2016/0327436 A1  Nov. 10, 2016

Related U.S. Application Data (60) Provisional application No. 61/922,885, filed on Jan. 2, 2014.

(51) Int. Cl.
*G01K 11/32* (2006.01)
*G01L 1/24* (2006.01)

(52) U.S. Cl.
CPC ............. *G01K 11/32* (2013.01); *G01L 1/246* (2013.01); *G01K 2011/322* (2013.01)

(58) Field of Classification Search
CPC  G01D 5/35364; G01D 5/35303; G01L 1/246; G01K 2011/322; G01K 11/3206
(Continued)

(56) References Cited

U.S. PATENT DOCUMENTS

| | | | |
|---|---|---|---|
| 6,237,421 B1 | 5/2001 | Li et al. | |
| 8,988,671 B2 * | 3/2015 | Zhang | G01K 11/32 356/73.1 |

(Continued)

OTHER PUBLICATIONS

International Search Report of PCT Application No. PCT/IL2015/050006 dated May 27, 2015.

(Continued)

*Primary Examiner* — Que T Le
(74) *Attorney, Agent, or Firm* — Pearl Cohen Zedek Latzer Baratz LLP (57) ABSTRACT

A method of stimulated Brillouin scattering is proposed in which both slopes of the BGS spectrum are probed to achieve immunity to pump power variations. Suitably applied, the technique can maintain all the benefits of the known Slope-Assisted-BOTDA technique, while using the same setup but at the cost of halving the sampling speed. the method may include: obtaining a reference Brillouin gain spectrum (BGS) representative of steady state or average conditions in various locations of the optical fiber along its length; generating, based on the reference BGS, a probe wave being a complex waveform comprising a first and second set of waveforms, each set having waveforms tailored to match an opposite slope of the reference BGS, at the various locations; performing stimulated Brillouin scattering at the various locations by applying a pump pulse wave to the probe wave; and deducing the local Brillouin frequency shift (BFS) at the various locations.

14 Claims, 7 Drawing Sheets

(58) Field of Classification Search
USPC .............................. 250/227.14, 227.18, 221
See application file for complete search history.

(56) References Cited

U.S. PATENT DOCUMENTS

| | | |
|---|---|---|
| 2009/0008536 A1 | 1/2009 | Hartog et al. |
| 2013/0025374 A1 | 1/2013 | Voskoboinik et al. |
| 2013/0308682 A1 | 11/2013 | Tur et al. |
| 2014/0022536 A1 | 1/2014 | Peled et al. |

OTHER PUBLICATIONS

Peled et al., "Slope-assisted fast distributed sensing in optical fiber with arbitrary Brillouin profile", Opt. Express, vol. 19, No. 21, pp. 19845-19854, Sep. 26, 2011.
Motil et al., "Pump-Power—Independent Double Slope-Assisted Distributed and Fast Brillouin Fiber-Optic Sensor", IEEE Photonics Technology Letters, vol. 26, No. 8, pp. 797-800, Apr. 15, 2014.
Tsuji et al., "Sweep-free Brillouin optical time domain analysis using two individual laser sources", Opt. Rev., vol. 19, No. 6, pp. 381-387, Jan. 1, 2012.

\* cited by examiner

PUMP-POWER-INDEPENDENT DOUBLE SLOPE-ASSISTED DISTRIBUTED AND FAST BRILLOUIN FIBER-OPTIC SENSOR

CROSS-REFERENCE TO RELATED APPLICATIONS

This application is a National Phase Application of PCT International Application No. PCT/IL2015/050006, International Filing Date Jan. 1, 2015, entitled: "PUMP-POWER-INDEPENDENT DOUBLE SLOPE-ASSISTED DISTRIBUTED AND FAST BRILLOUIN FIBER-OPTIC SENSOR", published on Jul. 9, 2015 as International Patent Application Publication No. WO 2015/101995, claiming priority of U.S. Patent Application No. 61/922,885, filed Jan. 2, 2014, which is hereby incorporated by reference in its entirety.

FIELD OF THE INVENTION

The present invention relates to the use of Brillouin scattering to determine variations in physical properties of materials, such as temperature, stress and strain.

BACKGROUND OF THE INVENTION

Since the Brillouin frequency shift (BFS) in Brillouin scattering in optical fibers is affected by the sound velocity, as well as by the fiber refractive index, it has been used to detect variations in strain and temperature in a wide variety of applications. In typical practical applications, optical fibers are secured to or embedded in components whose properties are to be monitored such that variations in the properties of the components result in similar or corresponding variations in the properties of the fibers.

A method of using Brillouin scattering to determine strain and/or temperature variations in a distributed manner along the fiber typically involves injecting a pulsed pump signal into one end of the fiber and a constant wave (CW) probe signal into the other. This is often referred to as stimulated Brillouin scattering. The pump signal will usually be at a fixed frequency and the frequency of the probe signal will be scanned through a suitable range to derive the Brillouin Gain Spectrum "BGS" (or vice versa). The spectrum obtained under test conditions can be compared to the spectrum obtained during steady state conditions. A change in strain or temperature along the fiber will result in a frequency shift of the local BGS which can be measured, and after suitable calibration used to obtain measurements of variations in temperature and/or strain or other BFS-affecting phenomenon. This use of Brillouin scattering to determine variations in properties of materials is sometimes referred to as Brillouin sensing.

Practical applications of Brillouin scattering, using optical fibers to monitor strain, involve lengths of fiber of hundreds of meters to a many tens of kilometers.

Distributed sensing methods based on the Brillouin non-linear scattering effect have recently shown their growing potential for long distance (~1001 cm) and high spatial resolution (cm's). As noted above, most forms of sensing apparatus are based on the classical Brillouin Optical Time Domain Analysis (BOTDA), which maps the Brillouin Gain spectrum (BGS) along the fiber, from which the strain/temperature-dependent Brillouin frequency Shift (BFS) is determined Several methods have been developed in order to carry the Brillouin distributed sensing to the dynamic domain.

As a result of such developments the accuracy obtainable from measurements of Brillouin scattering is such that vibrations in a fiber caused by applied acoustic signals can be detected.

SUMMARY OF THE INVENTION

The inventors have discovered that by suitable choice of the probe frequency, it is not necessary to scan the probe signal over a range of frequencies or to map the complete BGS along the fiber. This is disclosed in US Patent Publication US20130308682-A1 and is referred to below as Slope-Assisted BOTDA. For a general explanation of the principles of BOTDA attention is also directed to U.S. Pat. No. 6,237,421B.

The method described in US Patent Publication US20130308682-A1 uses a tailored probe wave whose frequency, while at distance z into the fiber, is tuned within the linear section of either the rising or falling slopes of the BGS at z. Strain (temperature) variations spectrally shift the local BGS to lower or higher frequencies, depending on the sign of the applied strain (temperature), resulting in a change of the local Brillouin gain of the probe. Strain information is then deduced from the measured gain variations using a measured conversion factor.

Using the aforementioned Slope-Assisted BOTDA it has been found that the conversion factor is sensitive to variations in the pump power which are practically unavoidable. According to the method proposed in the following, both slopes of the BGS spectrum are probed in order to achieve immunity to pump power variations. This can be referred to herein as Double Slope-Assisted BOTDA (also DSA-BOTDA). Suitably applied, the technique can maintain all the benefits of the Slope-Assisted-BOTDA technique, while using the same setup but, effectively, half of the sampling speed.

These, additional, and/or other aspects and/or advantages of embodiments of the invention are set forth in the detailed description which follows.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Before discussing practical aspects of this invention the underlying theory will first be explained.

The logarithmic Brillouin-induced gain of the probe signal (i.e., the logarithm of the ratio of amplified probe intensity to the probe intensity with no pump power) at distance z into the fiber is given by:

$$G_B(z,v,v_B(z),P(z)) = \alpha P(z) \cdot S((v-v_b(z))/\Delta v_B), \qquad (1)$$

where $P(z)$ is the pump power at z, $S(v)$ is the normalized BGS, $v$ is the optical frequency of the probe, measured with respect to the that of the pump, $v_B$ (z) is the Brillouin Frequency Shift "BFS", denoting the strain/temperature sensitive location of the peak of the BGS at location z, and $\Delta v_B$ is the Full-Width-Half-Maximum (FWHM) of the BGS, assumed to be strain/temperature insensitive. $\alpha$ depends on various constants of the material but also on the relative polarizations of the pump and probe waves at z. Experimentally, this dependence is removed by polarization scrambling so that $\alpha$ will be treated from now on as a constant.

Specifically, the strength of the Brillouin interaction depends on the relative state of polarization (SOP) of the two interacting light waves, thus the relative SOP is scrambled (changed) by a polarization scrambler and later time averaging are used to average over all the SOP's.

The BGS is usually assumed to be a symmetrical Lorentzian distribution but this is not essential.

For an optical fiber in a dynamic strain environment, the BFS, $v_B$, as a function of both time and location along the fiber, can be described by:

$$v_B(t,z) = \bar{v}_B(z) + \delta v_B(t,z) \quad (2)$$

where $\delta v_B(t,z)$ and $\bar{v}_B(z)$, respectively, denote its dynamic and static (or averaged) components. In Slope Assisted-BOTDA, the probe frequency is set at either:

$$v^- = \bar{v}_B - \gamma \Delta v_B/2 \text{ or } v^+ = \bar{v}_B + \gamma \Delta v_B/2, \quad (3)$$

where $\gamma$ is a positive number (close to 1), and $v^+(v^-)$ are frequencies near the middle of the falling (rising) slopes of the BGS, where the strain to frequency sensitivity is positive (negative).

In order to overcome the pump power sensitivity of SA-BOTDA, which probes the fiber BGS at either $v^+$ or $v^-$, it is suggested herein to employ the fast tuning capability of the arbitrary wave generator (AWG), to periodically probe the fiber BGS at both $v^+$ and $v^-$.

Substituting (2) and (3) in (1) we obtain expressions for the two measurable logarithmic gains for small ($|\delta v_B(t,z)| < \Delta v_B$) deviations of $v_B(t,z)$ from its static/average value $\bar{v}_B(z)$:

$$G_B(z, v^{\pm}, \bar{v}_B(z) + \delta v_B(t, z), P(z)) = \alpha P(z) S((v^{\pm} - \bar{v}_B(z))/\Delta v_B) + \alpha P(z) \frac{\partial S((v^{\pm} - \bar{v}_B(z))/\Delta v_B)}{\partial v_B}\bigg|_{v_B = \bar{v}_B(z)} \cdot \delta v_B(t, z) \quad (4)$$

Due to the symmetry of the BGS, $S((v-v_B(z))/\Delta v_B)$, around $\bar{v}_B(z)$, the first term in (4) is the same for both $v^+$ and $v^-$, while the second term represents two opposite numbers. Defining $G_B^{sum}$ and $G_B^{diff}$ as the sum and difference of the two measured gains of (4), $\delta v_B(t,z)$ can now be deduced from:

$$\delta v_B(t, z) = \frac{S((v^+ - \bar{v}_B(z))/\Delta v_B)}{\frac{\partial S((v^+ - v_B(z))/\Delta v_B)}{\partial v_B}\bigg|_{v_B = \bar{v}_B(z)}} \frac{G_B^{diff}}{G_B^{sum}} \quad (5)$$

which depends on the BGS lineshape but is independent of $P(z)$. As long as the BGS is of a Lorentzian shape which is normally for pump pulse widths longer than $1/\Delta v_B$ as below:

$$\delta v_B(t, z) = \frac{1 + \gamma^2}{4\gamma} \frac{G_B^{diff}}{G_B^{sum}} \quad (6)$$

In accordance with another embodiment of the present invention, a distributed Double Slope Assisted BOTDA can be implemented using the same hardware for overcoming the pump sensitivity but this time by using the ratio of the gain measured at $v^{30}$ (z) and $v^-(z)$, i.e. the gain measured at the opposing slopes of the BGS. This gain ratio can be described by the following equation (7):

$$R_B(\delta v_B, z, v^+, v^-) = \frac{G_B(z, v^+(z), \bar{v}_B(z) + \delta v_B, P(z))}{G_B(z, v^-(z), \bar{v}_B(z) + \delta v_B, P(z))} \quad (7)$$

$$= \frac{S([v^+(z) - \bar{v}_B(z) - \delta v_B(t, z)]/\Delta v_B)}{S([v^-(z) - \bar{v}_B(z) - \delta v_B(t, z)]/\Delta v_B)}$$

which is a function of $\delta v_B(t,z)$ but is independent of the pump power, $P(z)$. For $\delta v_B(t,z) = 0$ this ratio is unity if both $v^+(z)$ and $v^-(z)$ experience the same Brillouin gain. For a given shape of the BGS, which strongly depends on the shape of the pump pulse for pulse widths shorter than ~50 ns, a logarithmic plot of $R_B(\delta v_B, z, v^+, v^-)$ against $\delta v_B(t,z)$ produces a family of calibration curves that depend on the frequency difference $\Delta v = v^+(z) - v^-(z)$.

While small values of $\Delta v$ give rise to shallow curves, the large $\Delta v$ ones provide higher sensitivity but are more prone to noise, since either or $v^+$ or $v^-$ experiences a relatively low Brillouin gain. While it is preferred to choose $v^+(z)$ and $v^-(z)$ to have equal gains, failure to do so only shifts the zero point for $\log(R_B(\delta v_B, z, v^+, v^-))$ as a function of $\delta v_B$. It is also seen that quite a wide dynamic range is available, of the order of the width of the BGS.

The optimal location to produce the estimation would be as close as possible to the −3 dB point of the slopes in order to maximize the measurement dynamic range.

An asymmetrical BGS lineshape gives rise to a more complex expression for $\delta v_B(t,z)$, which is still independent of $P(z)$. In conclusion: once the BGS lineshape is known, probing it at two judiciously chosen frequencies is enough to produce an estimate of $\delta v_B(t,z)$ which is independent of $P(z)$.

This use of frequencies on both slopes of the BGS forms the basis of this invention.

In one aspect there is provided in the following a method for use in determining local variations in of the Brillouin Frequency Shift (BFS) along an optical fiber, the method comprising: obtaining a Brillouin gain spectrum (BGS) representative of steady state (or average) conditions along the fiber; determining from the steady state (or average) BGS first and second probe frequencies, the first and second frequencies being on the positive and negative slopes of the gain spectrum respectively; performing stimulated Brillouin scattering using a probe signal tuned to said first and second frequencies; and comparing the BGS obtained from the measurements with the BGS obtained in a reference measurement, to yield data indicative of variations in the BFS along the fiber.

It will be appreciated that in practice the steady state BGS may be derived by averaging multiple scattering events in steady state conditions. The determination of the steady state (or average) BGS may be carried out "offline" possibly using other equipment, and is therefore not necessarily an essential part of the inventive method.

It will be determined at a startup phase and may be updated from time to time. In a practical implementation the steady state BGS may be stored in a look-up table for example. It should be noted that the when the startup phase is not steady, an averaged value is calculated and is regarded as a reference BGS which may be stored in a memory for later use.

It will be clear from the above discussion of the related art that the method of this aspect of the invention will usually be carried out on multiple points along an optical fiber. Also it will be appreciated that the variations in the measured BFS will usually be used to determine BFS-affecting-phenomena such as stress or strain or temperature variations in the fiber, or any combination of such phenomena. These might for example be induced by variations in the same phenomena occurring in a material in which the fiber is embedded or to which it is attached.

In the preferred embodiment of the invention the first and second probe frequencies are at positions of equal gain on the steady state (or average) BGS, i.e. the graph of gain versus frequency. These will usually, but not necessarily, be around the −3 dB points. Alternatively other pairs of points may be used, for example opposite points on the linear parts of the BGS.

Interestingly the method does not rely on the BGS being symmetrical and is applicable even when the BGS is asymmetrical.

As noted above the benefit of using probe frequencies on opposite slopes of the BGS is the immunity to pump signal power. Therefore the method can be carried out with a pump signal whose power varies over time. It should be noted that the sampling rate is assumed to be faster than the pump temporal variations.

In a preferred embodiment of the invention the probe signal switches between the first and second frequencies between two consecutive pump pulses for the predetermined point along the fiber. As a result, the sampling rate is effectively halved when compared with previously known slope-assisted BOTDA measurements techniques. It is preferable but not essential for the total durations of time segments in the probe signal at the first and second frequency to be equal.

In the aforementioned distributed sensing method, embodiments of the present invention provide a method, in which all the fiber points are scanned simultaneously wherein the measurement and the number of the scanned points is limited only by the spatial resolution of the measurement. The probe signal is thus a complex light wave having two frequency segments, each of the segments having the length of the fiber whose temperature, stress, strain or other physical characteristics are to be investigated.

Embodiments of the invention also provides in another aspect an apparatus for use in determining local variations in the measured BFS in an optical fiber along its length using Brillouin scattering, the apparatus may include: One or more radiation sources configured to supply a pump wave to one end of the fiber and a probe wave to the other end of the fiber in order to stimulate Brillouin scattering, the probe wave includes a complex waveform, which includes two sets of waveforms, each set adjusted to match respective points on opposite slopes of the BGS. The apparatus may further include one or more receivers configured to receive Brillouin scattered radiation from the fiber. The apparatus may further include one or more processors configured to derive the BFS from the stimulated scattering and compare it to a reference BFS measurement, to yield data indicative of variations in the BFS, and hence the strain/temperature of the fiber along its length.

Figure 1:
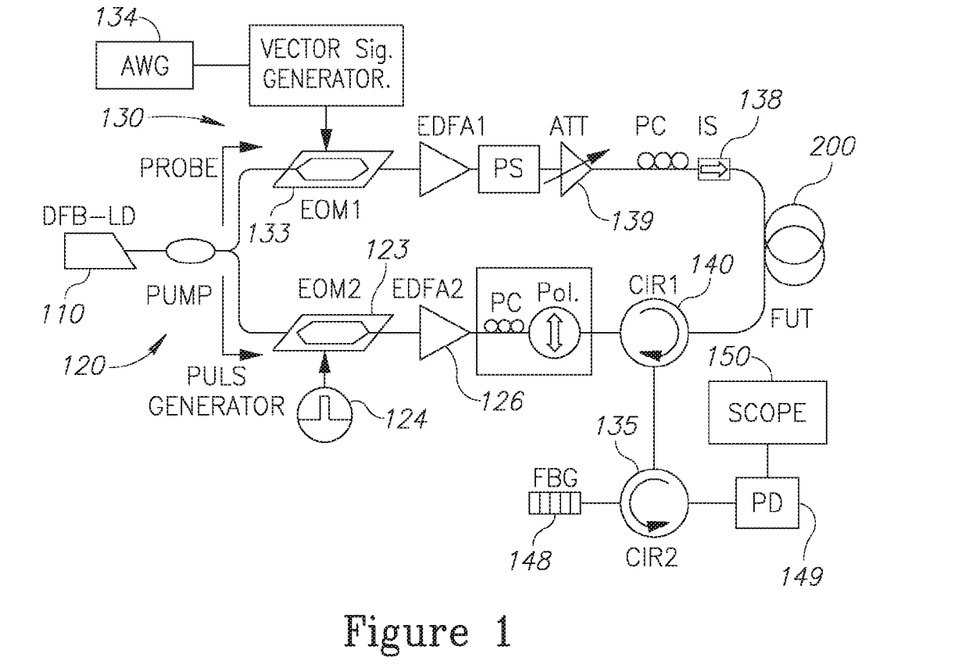
FIG. 1 is a schematic diagram illustrating an exemplary experimental set-up configured to carry out a method according to the invention.

FIG. 1 is a schematic block diagram illustrating an exemplary experimental system configured to carry out methods according to some embodiments of the invention.

A radiation source in the form of a narrow line-width (e.g. 10 KHz) Distributed Feedback Laser (DFB) laser diode 110 is split into pump 120 and probe 130 channels. It will be appreciated that more than one source could be used if desired.

The pump signal is supplied to electro-optic modulator 123 where it is modulated with pulses from pulse generator 124 and from there supplied to erbium-doped fiber amplifier 126. The output of amplifier 126 is supplied to first router 140 from where it is injected into one end of the fiber under test (FUT) 200.

The CW probe signal is supplied to electro-optic modulator 134 where it is modulated with a signal from arbitrary wave generator 133 to generate a complex probe wave, i.e. a probe wave having time segments of different predetermined frequency. The complex probe wave will have time segments of two sets of different waveforms, wherein each segment proportionally matching the length of fiber 200. The complex probe wave is supplied to erbium-doped amplifier 136. The output of amplifier 136 is supplied to polarization scrambler 137, from there to isolator 138 followed by attenuator 139. The signal output from attenuator 139 is injected into the other end of the fiber under test 200.

The Brillouin amplified probe wave is routed by first router 140 to second router 145 where the fiber Bragg grating 148 is used to filter out one of the probe's side bands. From second router 145 the Brillouin amplified probe wave is routed via fast photodiode 149 to real time oscilloscope 150. One or more processors in the oscilloscope will derive the BFS from stimulated scattering and compare it to a BFS obtained under steady state conditions to yield data indicative of variations in the BFS along the fiber at each predetermined point, as will be explained in more detail below.

Figure 2:
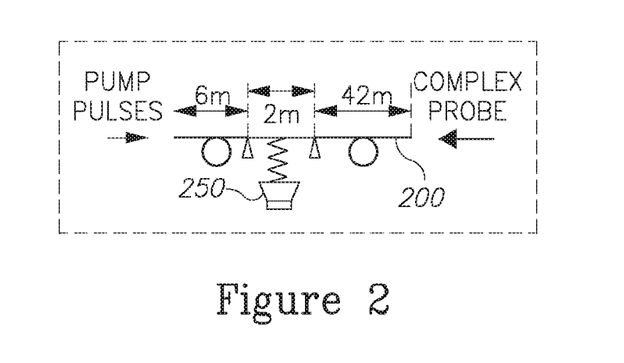
FIG. 2 is a schematic illustration of the application of dynamic strain to a stretched fiber under test.

In one experiment carried out, the fiber 200 was ~50 m in length. A 1.3 m fiber segment was first manually stretched and then vibrated by an attached speaker 250. Thus the BFS obtained for the stretched condition would represent the steady state (or average) and the vibrations induced by the speaker would impose oscillating strain on the fiber. The set-up is shown schematically in FIG. 2. The BFS profile of the FUT 200 was retrieved using a Fast-BOTDA (FBOTDA) measurement, with a 12 ns (1.2 m) wide pump pulse. The BGS FWHM of the stretched 1.3 m section was measured as well and was found to be 70 MHz, matching the BGS FWHM reported in literature for a 13 ns wide pump pulse.

Figure 3:
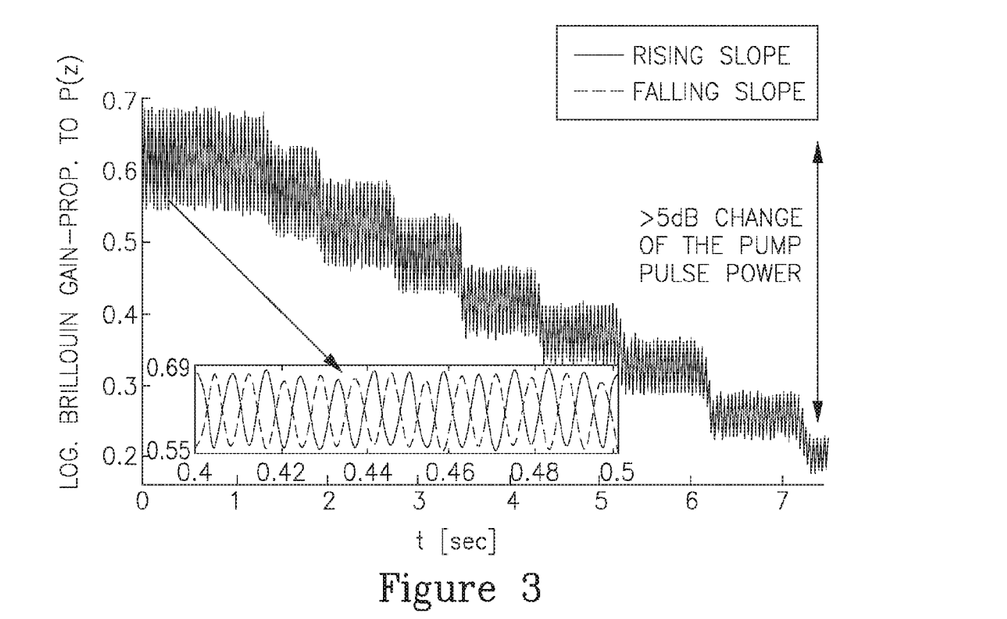
FIGS. 3-11 show various graphs illustrating results of measurements taken from experiments in accordance with embodiments of the present invention.

FIG. 3 shows Two SA-BOTDA gain measurements induced by the 120 Hz strain variations, taken at opposite slopes of the BGS, showing the dependence of the readings on >5 dB changes in the pump power.

Figure 4:
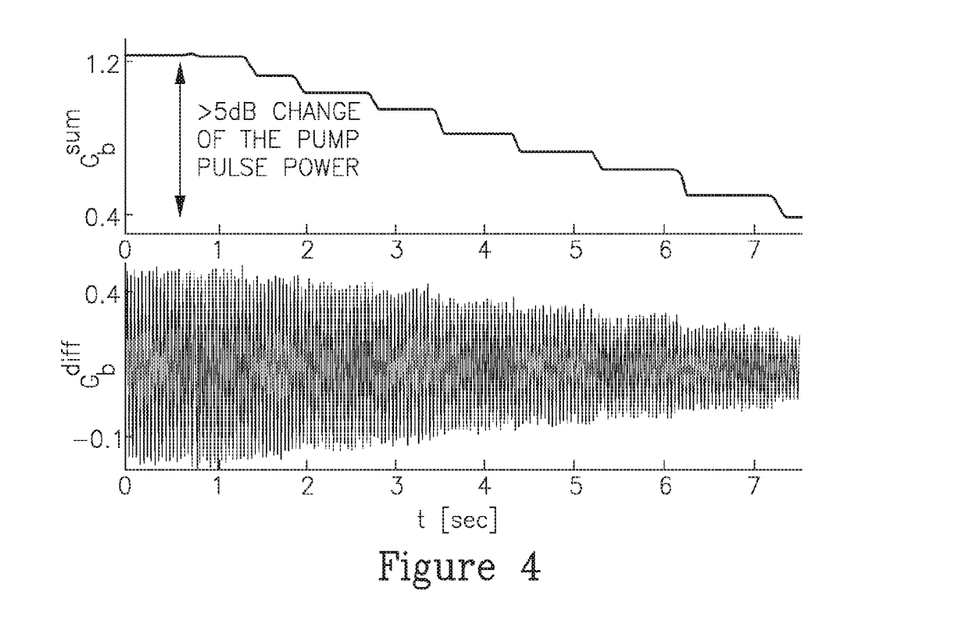

FIG. 4 shows the sum and difference of the two measured SA-BOTDA gains of FIG. 3.

Figure 5:
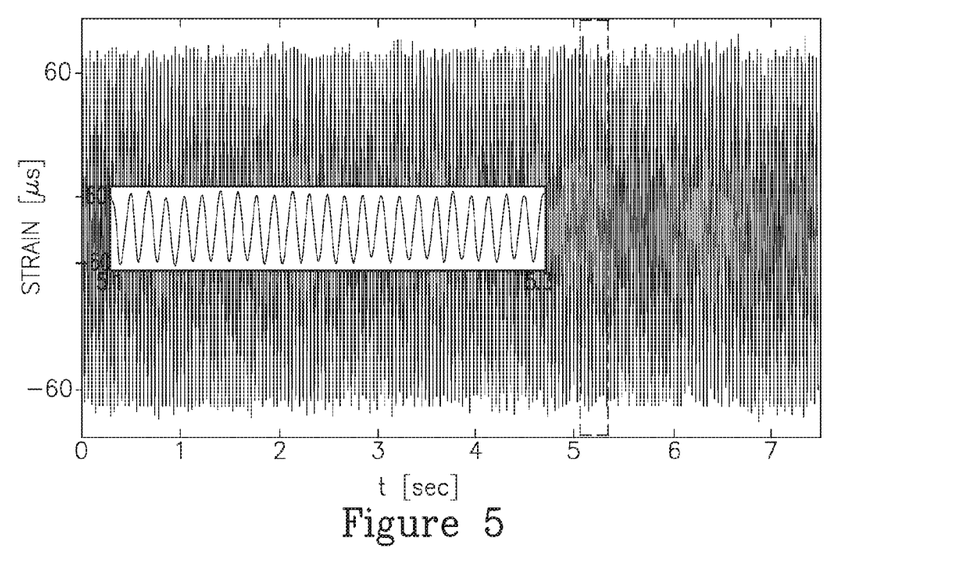

FIG. 5 shows he extracted 120 Hz strain variations. Although the pump pulse power was changed by more than 5 dB, the amplitude of strain variations remained constant.

As it is possible to switch fast between frequencies (a few ns) and the length of each frequency segment is tunable, with the use of an AWG, this method can produce a fast and distributed Brillouin measurement on any length of fiber regardless of its unique Brillouin profile, as long as both fiber attributes are known in advance In the first experiment, testing the first implementation of the DSA BOTDA ((4)-(6)) the frequency of the first probe segment matched the −3 dB point of the BGS rising slope, 10.9 GHz and the second segment frequency matched the −3 dB point of the BGS falling slope, 10.97 GHz. During the measurement, a polarization scrambler was used, which together with the performance of time averaging, compensated for the probe's gain dependency at the relative state of polarization (SOP) between the two counter-propagating light waves.

12 ns wide pump pulses, at a repetition rate of 666 kHz were used in the measurement, as 256 time averages were performed, the effective sampling rate was found to be 1.3 kHz (666 kHz/256/2). The amplitude of the amplified complex probe was sampled at 1 GSamples/s by a real-time oscilloscope with deep memory as it exited the FUT. Each segment of the complex probe amplitude sample was first divided by the probe amplitude as it entered the fiber to extract the Brillouin gain. Following the post processing procedure, described above, and using the known frequency to strain ratio, 50 MHz/1000 µε, the strain variations of the 1.3 m vibrated section were extracted from the measurement, as shown in FIG. 5.

Figure 6:
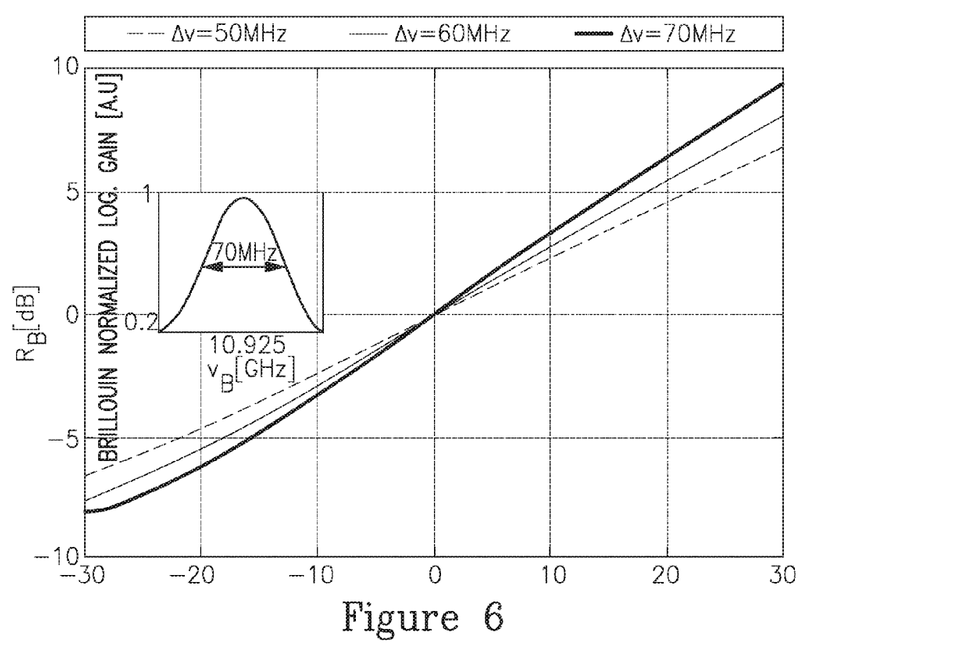

In a second experiment, testing the DSA-BOTDA implementation of equation (7), a 2 m segment was stretched to $\bar{v}_B$=10.925 GHz, which is 65 MHz away from that of the rest of the fiber, and then vibrated by an attached speaker at a frequency of 55 Hz. The inset of FIG. 6 shows the BGS of the 2 m fiber section, measured with the setup of FIG. 1, using its Fast-BOTDA characteristics, with a pump pulse width of 15 ns (providing ~1.5 m of spatial resolution).

Figure 7:
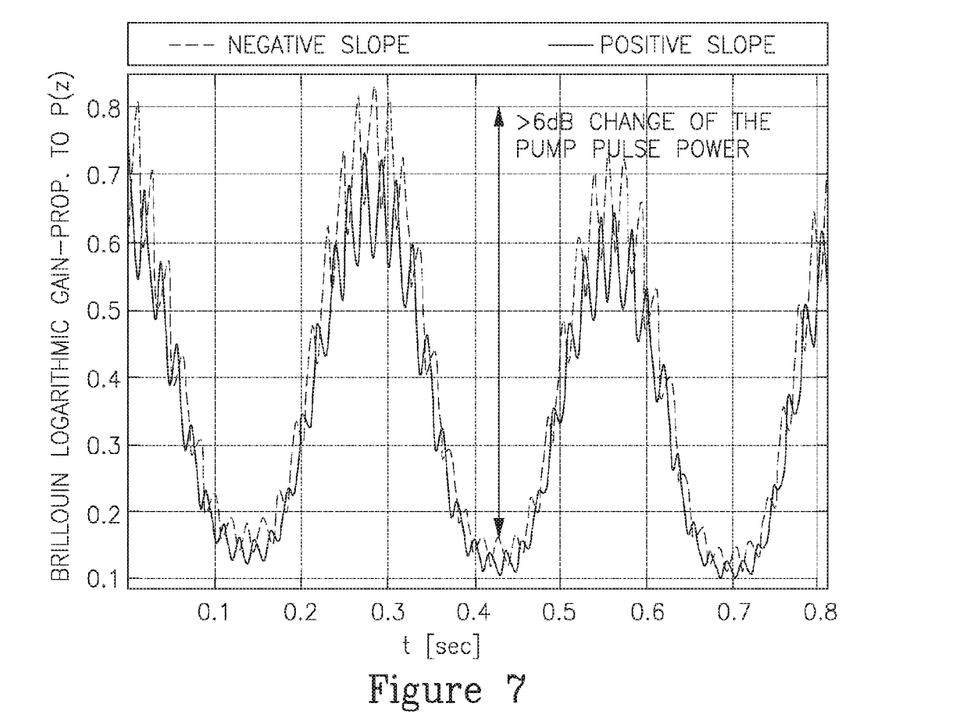
Figure 8:
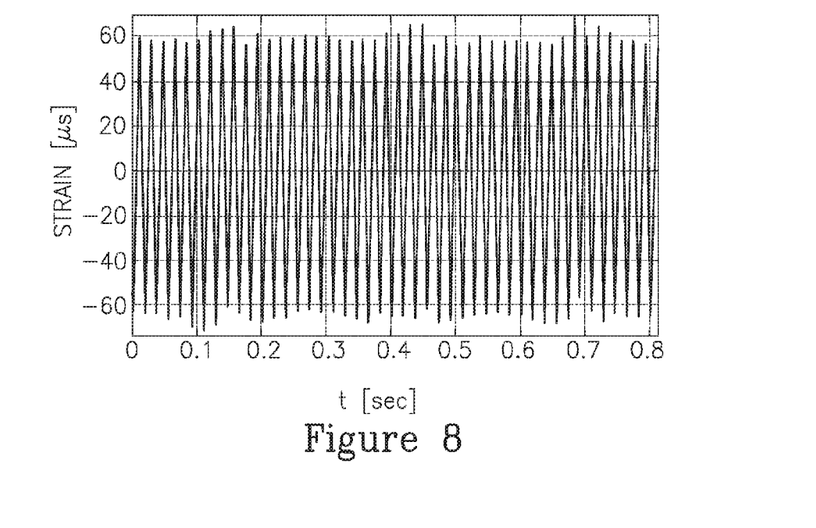

The experimentally obtained shape of the BGS was then used to calculate a family of RB curves as a function of BFS deviations, $\delta v_B$, for different values of $\Delta v=v+-v-$. For the dynamic measurement, the $\Delta v=70$ MHz ($\delta \pm =1$), solid curve in FIG. 6 was chosen as a compromise between sensitivity (the slope of the $R_B$ curve), the dynamic range and the measurement SNR, which is higher for lower values of $\Delta v$. The pump was pulsed at the rate of 1 MHz. The Brillouin-amplified probe intensity, as measured by the photo-detector, was sampled at 250 MSamples/s by a real time oscilloscope with deep memory and divided by the no-pump probe values to determine the linear and then the logarithmic gains. The interlaced results from v+ and v− were time-demultiplexed and individually averaged over 500 realizations of the polarization scrambler, resulting in an effective sampling rate of 1 kHz {=1 MHz/(500 averages)/(2 slopes)}. $R_B$ was then calculated as a function of time and was later translated into frequency deviations by the $\Delta v=70$ MHz curve of FIG. 6. The frequency deviations were converted to strain values using a previously obtained factor of 1000 µε/50 MHz. Finally, the immunity of the DSA-BOTDA method to pump power changes was verified by manually varying the latter using a polarization controller followed by an in-line polarizer, FIG. 1. FIG. 7 shows two conventional SA-BOTDA data series, experimentally obtained from the two probing frequencies. As expected, the results from the two slopes are out of phase and their magnitudes, while almost equal, significantly depend on the pump power, which spanned a range in excess of 6 dB, as inferred from the ordinate values which are proportional to P(z). In contrast, the DSA-BOTDA results of FIG. 8 confirm the immunity of the technique to pump power variations, as the measured strain variations amplitude remains constant while the pump power is not.

Figure 9:
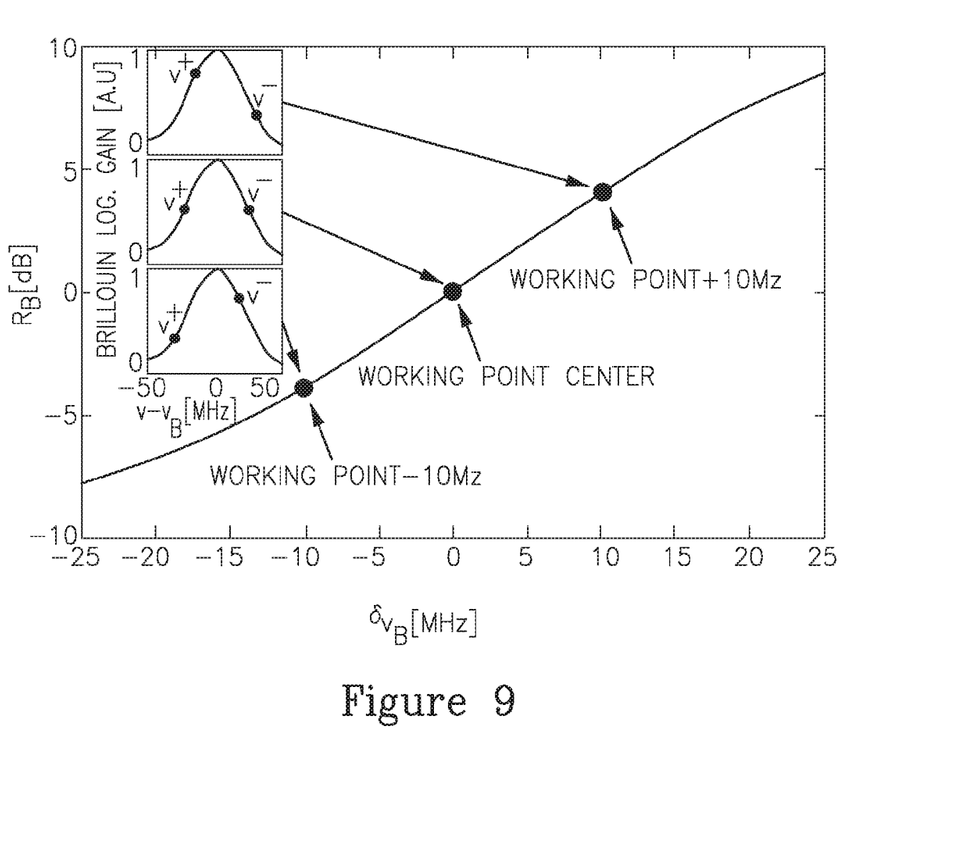
Figure 10:
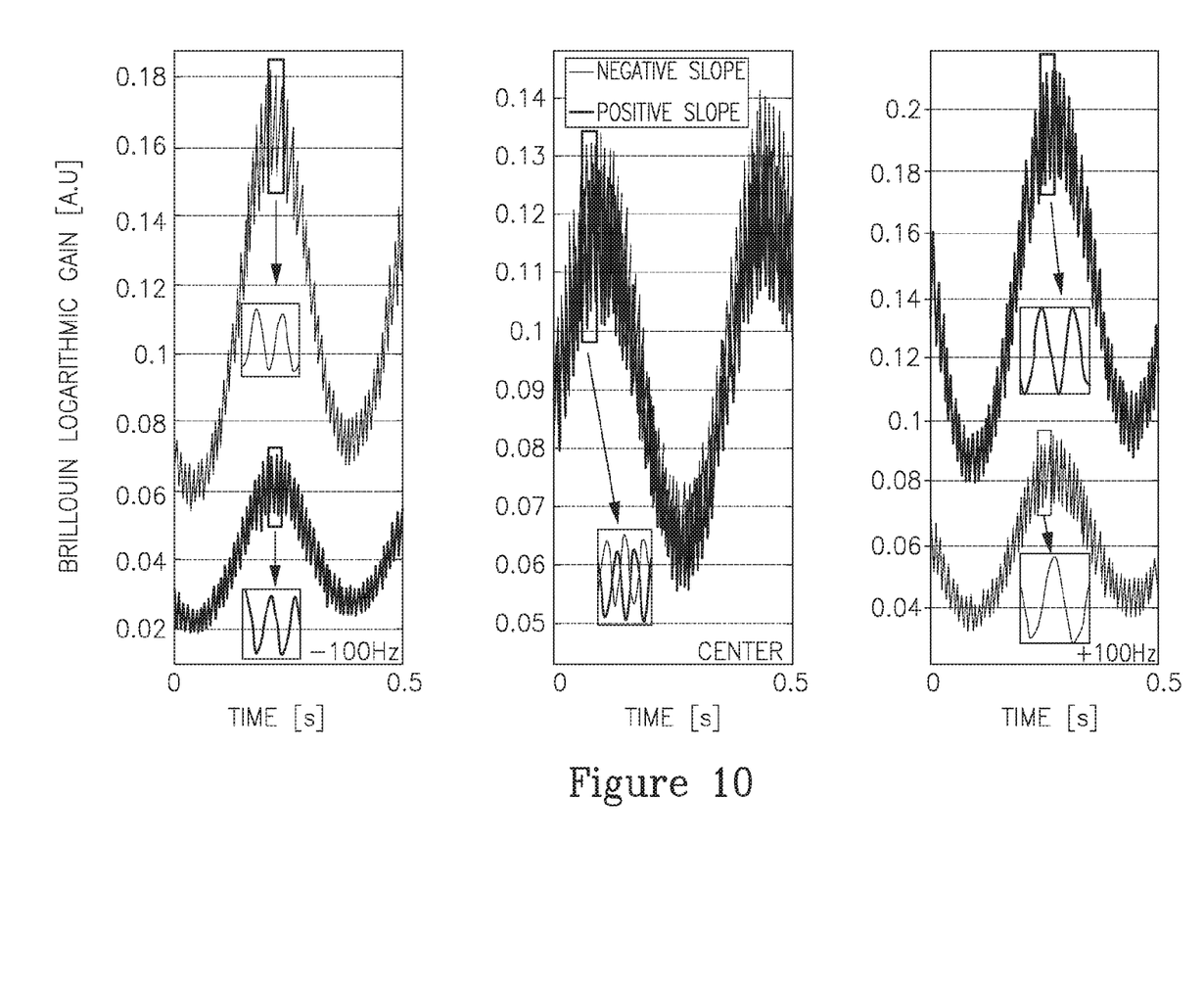
Figure 11:
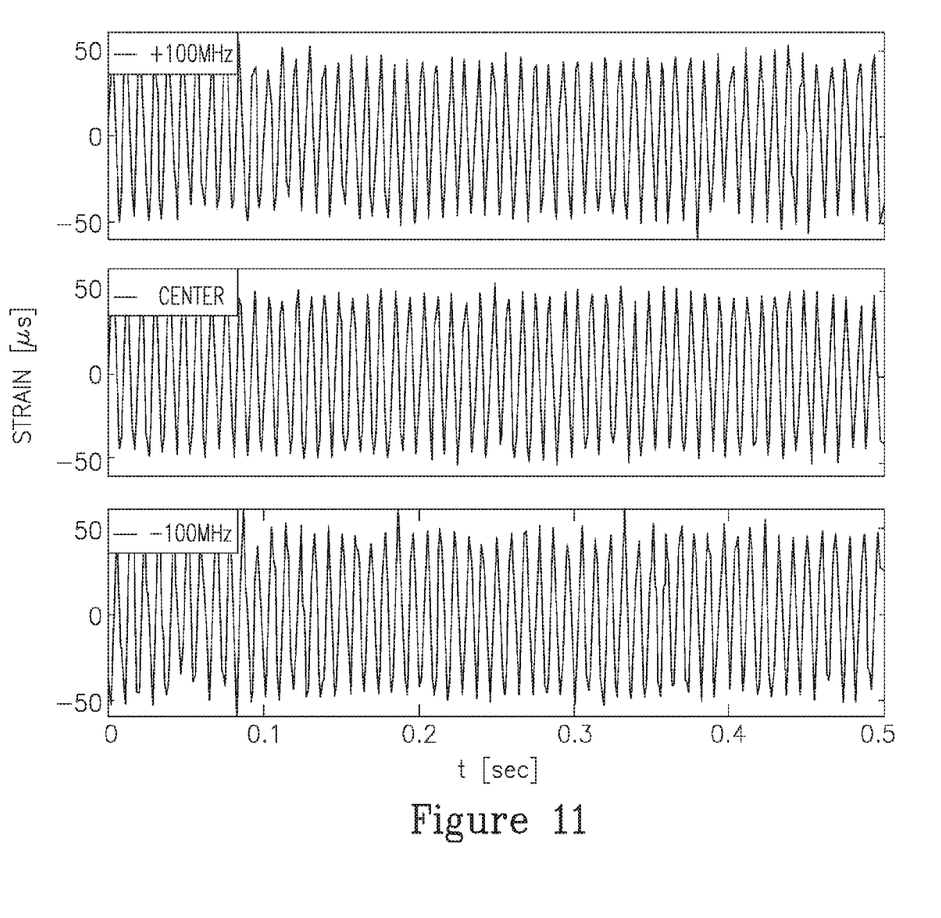

As will be shown herein, the DSA-BOTDA method works well also when $\gamma \pm \neq 1$ (e.g., when v+ and v− are not centered around the gain peak). Here, vibrations of 110 Hz, with a slightly lower magnitude were measured for three different combinations of {v+, v−}, subject to $\Delta v=v+-v-=70$ MHz. These three choices of $\gamma \pm$ are represented in FIG. 9 as three working points along the $\Delta v=70$ MHz ratio curve. Their frequency deviations from the center were: −10 MHz ($\gamma+\approx 1.285$, $\gamma-\approx 0.714$), 0 MHz ($\gamma \pm =1$) and +10 MHz ($\gamma+\approx 0.714$, $\gamma-\approx 1.285$). During each measurement the pump pulse power was varied by 3 dB. In FIG. 10 the three SA-BOTDA data series are presented for the three working points. The extracted 110 Hz strain vibrations are presented in FIG. 11. The strain measured around the −10 MHz, canter (0 MHz) and +10 MHz working points is 46±1 µε, 47.7±1 µε and 47.5±1 µε (rms) respectively. Again, the measured values appear to be independent of both the variations in the pump pulse power and the chosen working point along the RB slope.

The immunity of the double slope BOTDA method to significant pump power variations has been successfully demonstrated herein. The technique employs the same hardware used by the tailored-probe SA-BOTDA and maintains all of its advantages. In particular, it can handle Brillouin longitudinally-inhomogeneous fibers where now the values of both v− and v+=v−+$\Delta v$ are tailored to track their corresponding points on the z-dependent BGS. The sample rate, though, is compromised by a factor of 2. Yet, very high sampling rates can be achieved, satisfying many practical dynamic needs. Here we demonstrated an effective sampling rate of 1 kHz, mainly limited by the need to average over the random polarization states generated by the polarization scrambler. The spatial resolution of the DSA-BOTDA can be also greatly improved by employing one of the available methods for spatial resolution enhancement.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for determining local variations in strain and/or temperature along an optical fiber, the method comprising:
    obtaining a reference Brillouin gain spectrum (BGS) representative of steady state or average conditions in various locations of the optical fiber along its length;
    generating, based on the reference BGS, a probe wave being a complex waveform comprising a first and second set of waveforms, each set having waveforms tailored to match an opposite slope of the reference BGS, at said various locations;
    performing stimulated Brillouin scattering at said various locations by applying a pump pulse wave to said probe wave; and
    deducing the local Brillouin frequency shift (BFS) at said various locations.

2. The method according to claim 1, in which the reference BGS is derived by averaging multiple scattering events.

3. The method according to claim 1, in which the steady state or average BGS is asymmetrical about the peak gain.

4. The method according to claim 1, in which the pump signal used for stimulating Brillouin scattering has a power level which varies over time.

5. The method according to claim 1, in which the pump signal used for stimulating Brillouin scattering comprises a pulse timed to meet the probe signal along the fiber and in which the probe signal switches between the waveforms of the first and second sets.

6. The method according to claim 5, in which the total durations of time segments at the first set of waveforms is equal to the total durations of time segments at the second set of waveforms.

7. A method comprising performing the method of claim 1, for multiple different predetermined points along the length of the fiber.

8. An apparatus for determining local variations in strain and/or temperature along an optical fiber, the apparatus comprising:
    a memory for storing a reference Brillouin gain spectrum (BGS) representative of steady state or average conditions in various locations of the optical fiber along its length;
    a signal generator configured to generate, based on the reference BGS, a probe wave being a complex waveform comprising a first and second set of waveforms, each set having waveforms tailored to match an opposite slope of the reference BGS, at said various locations;
    a pulse generator; and
    a computer processor configured to invoke stimulated Brillouin scattering at said various locations by controlling the pulse generator and the signal generator, for applying a pulse wave to said probe wave,
    wherein the computed processor is further configured to deduce a local Brillouin frequency shift (BFS) at said various locations.

9. The apparatus according to claim 8, in which the reference BGS is derived by averaging multiple scattering events.

10. The apparatus according to claim 8, in which the steady state or average BGS is asymmetrical about the peak gain.

11. The apparatus according to claim 8, in which the pump signal used for stimulating Brillouin scattering has a power level which varies over time.

12. The apparatus according to claim 8, in which the pump signal used for stimulating Brillouin scattering comprises a pulse timed to meet the probe signal along the fiber and in which the probe signal switches between the waveforms of the first and second sets.

13. The apparatus according to claim 12, in which the total durations of time segments at the first set of waveforms is equal to the total durations of time segments at the second set of waveforms.

14. The apparatus according to claim 8, configured to operate at multiple different predetermined points along the length of the fiber.

* * * * *